United States Patent
Lee et al.

(10) Patent No.: US 10,655,196 B2
(45) Date of Patent: *May 19, 2020

(54) AUSTENITIC STEEL HAVING EXCELLENT MACHINABILITY AND ULTRA-LOW TEMPERATURE TOUGHNESS IN WELD HEAT-AFFECTED ZONE, AND METHOD OF MANUFACTURING THE SAME

(71) Applicant: POSCO, Pohang-si, Gyeongsangbuk-do (KR)

(72) Inventors: Soon-Gi Lee, Pohang-si (KR); Jong-Kyo Choi, Pohang-si (KR); Young-Hwan Park, Pohang-si (KR); Hee-Goon Noh, Pohang-si (KR); Hyun-Kwan Cho, Pohang-si (KR); In-Shik Suh, Pohang-si (KR); In-Gyu Park, Pohang-si (KR); Hong-Ju Lee, Pohang-si (KR)

(73) Assignee: POSCO, Pohang-Si, Gyeongsangbuk-do (KR)

( * ) Notice: Subject to any disclaimer, the term of this patent is extended or adjusted under 35 U.S.C. 154(b) by 594 days.

This patent is subject to a terminal disclaimer.

(21) Appl. No.: 14/369,090

(22) PCT Filed: Dec. 27, 2012

(86) PCT No.: PCT/KR2012/011537
§ 371 (c)(1),
(2) Date: Jun. 26, 2014

(87) PCT Pub. No.: WO2013/100614
PCT Pub. Date: Jul. 4, 2013

(65) Prior Publication Data
US 2015/0020928 A1 Jan. 22, 2015

(30) Foreign Application Priority Data

Dec. 27, 2011 (KR) .................. 10-2011-0143966
Dec. 21, 2012 (KR) .................. 10-2012-0151508

(51) Int. Cl.
*C21D 9/50* (2006.01)
*C22C 38/00* (2006.01)
(Continued)

(52) U.S. Cl.
CPC .............. *C21D 9/505* (2013.01); *B23K 31/02* (2013.01); *B23K 35/3073* (2013.01);
(Continued)

(58) Field of Classification Search
CPC .......... C22C 38/04; C22C 38/00; C21D 9/505
(Continued)

(56) References Cited

U.S. PATENT DOCUMENTS 4,257,808 A 3/1981 Morris, Jr. et al.
5,431,753 A 7/1995 Kim et al.
(Continued)

FOREIGN PATENT DOCUMENTS

CH 192400 A * 8/1937
CH 192400 A 8/1937
(Continued)

OTHER PUBLICATIONS

International Search Report from the Korean Patent Office for International Application No. PCT/KR2012/011537 dated Apr. 8, 2013.
(Continued)

*Primary Examiner* — Weiping Zhu
(74) *Attorney, Agent, or Firm* — Cantor Colburn LLP (57) ABSTRACT

Provided are an austenitic steel having excellent machinability and ultra-low temperature toughness in a weld heat-affected zone including 15 wt % to 35 wt % of manganese (Mn), carbon (C) satisfying 23.6C+Mn≥28 and 33.5C−Mn≤23, 5 wt % or less (excluding 0 wt %) of copper (Cu), chromium (Cr) satisfying 28.5C+4.4Cr≤57 (excluding 0 wt %), and iron (Fe) as well as other unavoidable impurities as
(Continued)

a remainder, wherein a Charpy impact value of a weld heat-affected zone at −196° C. is 41 J or more, and a method of manufacturing the steel.

According to the present invention, a low-cost ultra-low temperature steel may be obtained, a stable austenite phase may be formed at low temperature, carbide formation may be effectively suppressed, and a structural steel having excellent machinability and ultra-low temperature toughness in a weld heat-affected zone may be provided.

3 Claims, 2 Drawing Sheets

(51) Int. Cl.
*C22C 38/38* (2006.01)
*C21D 6/00* (2006.01)
*C22C 38/28* (2006.01)
*C22C 38/24* (2006.01)
*C22C 38/26* (2006.01)
*C22C 38/20* (2006.01)
*C22C 38/60* (2006.01)
*C22C 38/04* (2006.01)
*B23K 31/02* (2006.01)
*B23K 35/30* (2006.01)
*B23K 101/00* (2006.01)
*C21D 9/46* (2006.01)

(52) U.S. Cl.
CPC .............. *C21D 6/005* (2013.01); *C22C 38/00* (2013.01); *C22C 38/001* (2013.01); *C22C 38/002* (2013.01); *C22C 38/04* (2013.01); *C22C 38/20* (2013.01); *C22C 38/24* (2013.01); *C22C 38/26* (2013.01); *C22C 38/28* (2013.01); *C22C 38/38* (2013.01); *C22C 38/60* (2013.01); *B23K 2101/00* (2018.08); *C21D 9/46* (2013.01)

(58) Field of Classification Search
USPC ........................................................ 148/529
See application file for complete search history.

(56) References Cited

U.S. PATENT DOCUMENTS

| | | | |
|---|---|---|---|
| 7,976,650 B2 | 7/2011 | Drillet et al. | |
| 2002/0104592 A1* | 8/2002 | Sakamoto | C21D 1/18 |
| | | | 148/320 |
| 2008/0240969 A1 | 10/2008 | Kim et al. | |
| 2012/0160363 A1* | 6/2012 | Jin | C22C 38/04 |
| | | | 138/177 |
| 2012/0288396 A1 | 11/2012 | Lee et al. | |
| 2015/0078955 A1 | 3/2015 | Bouzekri et al. | |

FOREIGN PATENT DOCUMENTS

| | | |
|---|---|---|
| CN | 1846002 | 10/2006 |
| CN | 101248203 | 8/2008 |
| DE | 917673 C | 9/1954 |
| GB | 605440 A | 7/1948 |
| JP | 55-110757 | 8/1980 |
| JP | 56-023260 | 3/1981 |
| JP | 58-96853 | 6/1983 |
| JP | 58-197256 | 11/1983 |
| JP | 04-141557 | 5/1992 |
| JP | 2005-232513 A | 9/2005 |
| JP | 2007-126715 | 5/2007 |
| JP | 2011-246817 A | 12/2011 |
| KR | 1991-0012277 | 8/1991 |
| KR | 10-1994-007374 B1 | 8/1994 |
| KR | 1997-0043149 | 7/1997 |
| KR | 1998-0058369 | 9/1998 |
| KR | 2010-0084570 A | 7/2010 |
| KR | 10-1004268 B1 | 1/2011 |
| KR | 10-2011-0075610 A | 7/2011 |
| WO | WO 2007/080646 A1 | 7/2007 |

OTHER PUBLICATIONS

Office Action issued by Korean Patent Office in counterpart Korean Application No. 10-2012-0151508, dated Jun. 11, 2014 (30 pages).
First Office Action issued by People's Republic of China Patent Office dated Oct. 8, 2015, in corresponding Patent Application Patent No. 2012-800706907.
English-language Extended Search Report from the European Patent Office in the corresponding European patent application No. 12862659.5 dated Dec. 21, 2015.
European Office Action—European Application No. 12862659.5 dated Sep. 18, 2018, citing CH 192 400, DE 917 673 and Yang, et al.
Yang, et al., Modeling Macro-and Microstructures of Gas-Metal-Arc Welded HSLA-100 Steel, Metallurgical and Materials Transactions B, 1999, pp. 483-493.

* cited by examiner

AUSTENITIC STEEL HAVING EXCELLENT MACHINABILITY AND ULTRA-LOW TEMPERATURE TOUGHNESS IN WELD HEAT-AFFECTED ZONE, AND METHOD OF MANUFACTURING THE SAME

TECHNICAL FIELD

The present invention relates to an austenitic steel having excellent machinability and ultra-low temperature toughness in a weld heat-affected zone, and a method of manufacturing the same, and more particularly, to a structural steel able to be used in a wide temperature range, from a low temperature liquefied gas environment, such as liquefied gas storage tanks and transport equipment, to room temperature.

BACKGROUND ART

Liquefied gases, such as liquefied natural gas (LNG, boiling point: −164° C.), liquefied oxygen (boiling point: −183° C.), and liquefied nitrogen (boiling point: −196° C.), require ultra-low temperature storage conditions. Thus, a structure, such as a pressure vessel formed of a material having sufficient toughness and strength at an ultra-low temperature is required to store these gases.

A chromium (Cr)-nickel (Ni)-based stainless steel alloy such as AISI304, a 9% Ni steel, and 5000 series aluminum alloys have been typically used as materials usable at the low temperatures of liquefied gas environments. However, with respect to the 5000 series aluminum alloys, the use thereof may be limited, because alloy material costs may be high, a design thickness of a structure may be increased due to the low strength of such alloys, and welding workability may be poor. Cr—Ni-based stainless steel and 9% Ni steel largely overcome the limitations in terms of the physical properties of aluminum. However, there have been limitations in the use thereof, for example, due to manufacturing costs being increased due to the addition of relatively expensive nickel.

In order to address these limitations, Patent Documents 1 and 2 disclose techniques of decreasing an amount of relatively expensive nickel and adding manganese and chromium instead. Patent Document 1 discloses a technique of improving ultra-low temperature toughness by securing an austenitic structure by decreasing the amount of nickel to 1.5% to 4% and adding 16% to 22% of manganese and 2% to 5.5% of chromium instead. Patent Document 2 discloses a technique of securing ultra-low temperature toughness by refining ferrite grains through repeated heat treatments and tempering while decreasing the amount of nickel to about 5.5% and adding 2.0% of manganese and 1.5% or less of chromium instead. However, since the above inventions also still contain relatively expensive nickel and various stages of repeated heat treatments and tempering are required to secure ultra-low temperature toughness, it may not be advantageous in terms of cost or process simplification.

Another technique related to a structural steel used in forming liquefied gas containment environments may include a so-called "Ni-free high manganese steel" from which nickel is completely excluded. The high manganese steel may be divided into ferritic and austenitic steels according to the amount of manganese added. For example, Patent Document 3 discloses a technique of improving ultra-low temperature toughness by adding 5% of manganese instead of 9% of nickel to refine grains through four heat treatments in a two-phase temperature range in which austenite and ferrite coexist, and then tempering. Also, Patent Document 4 discloses a technique of improving ultra-low temperature toughness by adding 13% of manganese to refine grains through four heat treatments in a two-phase temperature range of austenite and ferrite, and then tempering. The above patents include ferrite as a main structure, and have a main characteristic in which ferritic grains are refined through four or more heat treatments and tempering to obtain ultra-low temperature toughness. However, these techniques may have limitations in that costs may increase and heat treatment equipment may be overloaded due to an increase in the number of heat treatments.

Patent Document 5 discloses a technique related to a high manganese steel having excellent ultra-low temperature characteristics, in which a large amount, i.e., 16% to 35% of manganese and 0.1% to 0.5% of carbon are added instead of completely excluding nickel to stabilize austenite and 1% to 8% of aluminum is added. Patent Document 6 discloses that a high manganese steel having excellent low-temperature toughness may be obtained by forming a mixed structure of austenite and ε-martensite through the addition of 15% to 40% of manganese. However, since the amount of carbon is low, toughness may deteriorate due to the generation of a structure that is unstable at ultra-low temperatures, such as a ε-martensite structure. Also, the possibility of the occurrence of casting defects may increase due to the addition of aluminum.

Furthermore, since an austenitic high manganese steel may have poor machinability due to high work hardening, the lifespans of cutting tools may be decreased. Accordingly, production costs, such as tool costs and down times, related to the replacement of tools, may be increased.

RELATED ART DOCUMENTS (Patent Document 1) Korean Patent Application Laid-Open Publication No. 1988-0058369
(Patent Document 2) International Patent Application Laid-Open Publication No. WO2007/080646
(Patent Document 3) U.S. Pat. No. 4,257,808
(Patent Document 4) Korean Patent Application Laid-Open Publication No. 1997-0043149
(Patent Document 5) Korean Patent Application Laid-Open Publication No. 1991-0012277
(Patent Document 6) Japanese Patent Application Laid-Open Publication No. 2007-126715

DISCLOSURE

Technical Problem

An aspect of the present invention provides a relatively inexpensive steel excluding nickel, an austenitic steel in which an austenitic phase which is stable at low temperature is formed, machinability is excellent, and ultra-low temperature toughness in a weld heat-affected zone is secured, and a method of manufacturing the steel.

The object of the present invention is not limited thereto, however, and other objects not described herein will be clearly understood by those skilled in the art from descriptions provided below.

Technical Solution

According to an aspect of the present invention, there is provided an austenitic steel having excellent machinability and ultra-low temperature toughness in a weld heat-affected zone including: 15 wt % to 35 wt % of manganese (Mn); carbon (C) satisfying $23.6C+Mn \geq 28$ and $33.5C-Mn \leq 23$; 5 wt % or less (excluding 0 wt %) of copper (Cu); chromium (Cr) satisfying 28.5C+4.4Cr≤57 (excluding 0 wt %); and iron (Fe) as well as other unavoidable impurities as a remainder.

Where, Mn, C, and Cr in each equation denote an amount of the corresponding element in terms of weight percentage (wt %).

According to another aspect of the present invention, there is provided a method of manufacturing an austenitic steel having excellent machinability and ultra-low temperature toughness in a weld heat-affected zone including: obtaining a weld heat-affected zone by welding a steel including 15 wt % to 35 wt % of manganese (Mn); carbon (C) satisfying 23.6C+Mn≥28 and 33.5C−Mn≤23; 5 wt % or less (excluding 0 wt %) of copper (Cu); chromium (Cr) satisfying 28.5C+4.4Cr≤57 (excluding 0 wt %); and iron (Fe) as well as other unavoidable impurities as a remainder; and cooling the weld heat-affected zone at a cooling rate of 10° C./s or more.

Advantageous Effects

According to the present invention, since the amount of manganese may be controlled in a relatively low range while not adding nickel and aluminum, a relatively inexpensive, ultra-low temperature steel may be obtained. Also, a structural steel having excellent ultra-low temperature toughness in a weld heat-affected zone may be provided, in which an austenite phase stable at low temperature is formed, carbide formation is effectively suppressed by copper, and machinability is improved by the addition of calcium and sulfur.

BEST MODE

Hereinafter, an austenitic steel having excellent machinability and ultra-low temperature toughness in a weld heat-affected zone of the present invention and a method of manufacturing the same will be described in detail in such a manner that it may easily be carried out by a person with ordinary skill in the art to which the present invention pertains.

In order to stabilize austenite in a case in which an amount of manganese is low in an austenitic steel requiring ultra-low temperature toughness in a weld heat-affected zone, an amount of carbon must be increased and this may deteriorate toughness due to the formation of carbides. Also, the suppression of carbide precipitation is required to secure ultra-low temperature toughness, and in a case in which the control of a cooling rate is not facilitated, such as in a weld heat-affected zone, carbide precipitates in the weld heat-affected zone and this rapidly deteriorates the ultra-low temperature toughness. Therefore, there is an urgent need to develop an ultra-low temperature steel having excellent ultra-low temperature toughness in a weld heat-affected zone by stabilizing austenite through the appropriate control of manganese and carbon and adding alloying elements that are more effective in suppressing the formation of carbides than manganese. In addition, there is a need to develop a relatively inexpensive, ultra-low temperature steel without the addition of expensive nickel.

The present inventors recognized that in order for a steel without nickel to have sufficient toughness at an ultra-low temperature, a main structure of the steel may be required to be changed into an austenite structure in addition to the adjustment of a component system of the steel, and in particular, there is a need to control the formation of carbide at austenite grain boundaries in a weld heat-affected zone, thereby leading to the realization of the present invention. Also, the present inventors have deduced a composition of a steel that significantly improves machinability of an austenitic high manganese steel by adjusting amounts of calcium and sulfur.

Accordingly, a steel of the present invention may have a composition including 15 wt % to 35 wt % of manganese (Mn), carbon (C) satisfying 23.6C+Mn≥28 and 33.5C−Mn≤23, 5 wt % or less (excluding 0 wt %) of copper (Cu), chromium (Cr) satisfying 28.5C+4.4Cr≤57 (excluding 0 wt %), and iron (Fe) as well as other unavoidable impurities as a remainder. Where, Mn, C, and Cr in each equation denote an amount of the corresponding element.

The reason for limiting a range of each component will be described below. Hereinafter, it should be noted that a unit of the amount of each component is weight percentage (wt %) unless specifically mentioned otherwise.

Manganese (Mn): 15% to 35%

Manganese, as an important element added to a high manganese steel as in the present invention, stabilizes austenite. It is desirable to include Mn in an amount of 15% or more to stabilize austenite at an ultra-low temperature. In the case that the amount of Mn is less than 15%, since ε-martensite, a metastable phase, may be formed when an amount of carbon is small and the ε-martensite may be easily transformed to α-martensite by deformation-induced transformation at an ultra-low temperature, toughness may not be secured. Also, in a case in which the stabilization of austenite is promoted by increasing the amount of carbon in order to prevent the above phenomenon, it is not desirable because physical properties rapidly deteriorate due to the precipitation of carbide. In contrast, in the case in which the amount of Mn is greater than 35%, a corrosion rate of a steel may be reduced and economic efficiency may decrease due to the increase in the amount thereof. Therefore, the amount of Mn may be limited to 15% to 35%.

Carbon (C): Satisfying 23.6C+Mn≥28 and 33.5C−Mn≤23

Carbon is an element that stabilizes austenite and increases strength, and in particular, carbon may reduce $M_s$ and $M_d$, i.e., austenite at ε- and α-martensite transformation points during a cooling process and a deformation process. Thus, in the case that carbon is insufficiently added, the stability of austenite is insufficient, and thus, austenite stable at an ultra-low temperature may not be obtained. Also, deformation-induced transformation to ε- or α-martensite may easily occur due to external stress to reduce toughness as well as the strength of the steel. In contrast, in the case in which the amount of carbon is excessive, toughness may rapidly deteriorate due to the precipitation of carbide and processability may be decreased due to an excessive increase in the strength thereof.

Figure 1:
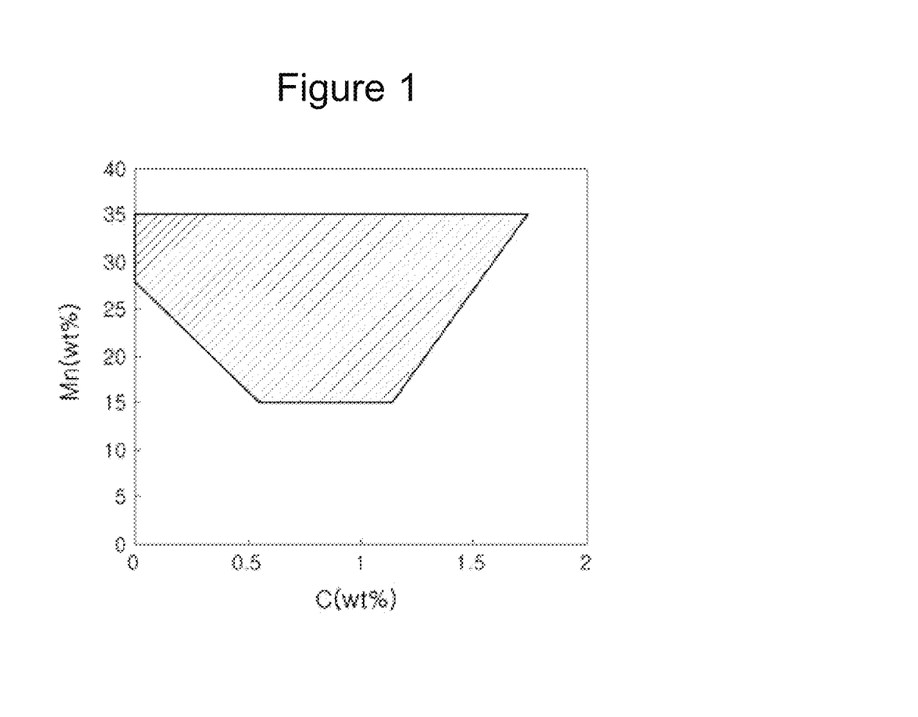
FIG. 1 is a graph illustrating a relationship between the amount of manganese and the amount of carbon according to an embodiment of the present invention.

In particular, the amount of carbon in the present invention may be carefully determined by considering the relationship between carbon and other elements added together. For this, the relationship between carbon and manganese, which is related to the formation of carbide and found by the present inventors, is illustrated in FIG. 1. Carbide is formed due to carbon. However, carbon does not independently affect the formation of the carbide, but affects the tendency of carbide formation by acting in combination with manganese. FIG. 1 illustrates an appropriate amount of carbon. In order to prevent the formation of carbide, it is desirable to control a value of 23.6C+Mn (where C and Mn represent the amount of each component in terms of weight %) to be 28 or more under the assumption that other components satisfy the ranges defined in the present invention. This denotes an inclined left boundary of a parallelogram region in FIG. 1. In the case that the value of 23.6C+Mn is less than 28, since the stability of austenite decreases, deformation-induced transformation occurs due to an impact at an ultra-low temperature. Thus, impact toughness may be reduced. In the case in which the amount of carbon is excessively high, that is, a value of 33.5C−Mn is greater than 23, since carbide may precipitate due to the excessive addition of carbon, low-temperature impact toughness may be reduced. In conclusion, it is desirable in the present invention to add manganese in the amount of 15% to 35% and to add carbon to satisfy 23.6C+Mn≥28 and 33.5C−Mn≤23. As illustrated in FIG. 1, the lowest limit of the amount of carbon in the range satisfying the above equations is 0%.

Copper (Cu): 5% or Less (Excluding 0%)

Since copper has a relatively low solubility in carbide and has a low diffusivity in austenite, copper is concentrated at boundaries between the austenite and the nucleated carbides. Accordingly, the copper may effectively delay the growth of carbides by preventing the diffusion of carbon, and may eventually prevent the formation of carbides. With respect to a parent material, the precipitation of carbide may be suppressed by accelerated cooling during a manufacturing process. However, with respect to a weld heat-affected zone, since the control of the cooling rate is not facilitated, copper, as an element which is relatively effective in the suppression of carbide precipitation, is added in the present invention. Also, copper may have an effect of stabilizing austenite to improve ultra-low temperature toughness. However, since copper may reduce hot workability of the steel when an amount of copper is greater than 5%, it may be desirable to control the upper limit of copper to be 5%. Also, the amount of copper for obtaining the above-described carbide suppression effect, for example, may be 0.5% or more.

Chromium (CR): 28.5C+4.4Cr≤57 (Excluding 0%)

Chromium up to an adequate amount improves impact toughness at low temperature by stabilizing austenite and increases the strength of a steel by being dissolved in austenite. Also, chromium is an element that improves corrosion resistance of the steel. However, chromium, as a carbide-forming element, may also reduce low-temperature impact toughness by particularly forming carbide at austenite grain boundaries. Therefore, an amount of chromium added in the present invention may be carefully determined by considering the relationship between carbon and other elements added together. In order to prevent the formation of carbide, it is desirable to control a value of 28.5C+4.4Cr (where C and Cr represent the amount of each component in terms of weight %) to be 57 or less under the assumption that other components satisfy the ranges defined in the present invention. In the case that the value of 28.5C+4.4Cr is greater than 57, it may be difficult to effectively suppress the formation of carbide at austenite grain boundaries due to the excessive amounts of chromium and carbon, and thus, impact toughness at low temperature may decrease. Therefore, chromium in the present invention may be added to satisfy 28.5C+4.4Cr≤57.

A residual component of the present invention is iron (Fe). However, since unintended impurities may be inevitably introduced from raw materials or the surrounding environment in a typical manufacturing process, these impurities may not be excluded. However, since these impurities are obvious to those skilled in the art, the entire contents thereof will not be specifically described in the present specification.

The steel of the present invention may further include 0.03 wt % to 0.1 wt % of sulfur (S) and 0.001 wt % to 0.01 wt % of calcium (Ca) in addition to the above components.

Sulfur (S): 0.03% to 0.1%

Sulfur is generally known as an element for improving machinability by being added with manganese to form a compound, i.e., manganese sulfide, which is easily cut and separated during a cutting process. Since sulfur may be melted by the heat generated from the cutting process, friction between a chip and a cutting tool may be reduced. Thus, sulfur may increase the lifetime of the cutting tool due to the effects such as a decrease of cutting tool wear through tool face lubrication and prevention of cutting edge build-up on the cutting tool. However, in the case that sulfur is excessively contained, mechanical properties of the steel may deteriorate due to a large amount of coarse manganese sulfide that is elongated during hot working, and hot workability may also be reduced due to the formation of iron sulfide. Therefore, the upper limit thereof may be 0.1%. Since sulfur may not improve the machinability when it is added in an amount less than 0.03%, the lower limit thereof may be controlled to be 0.03%.

Calcium (Ca): 0.001% to 0.01%

Calcium is an element that is mainly used to control the shape of manganese sulfide. Since calcium has a high affinity with sulfur, calcium forms calcium sulfide and is simultaneously dissolved in manganese sulfide. Since manganese sulfide is crystallized by including calcium sulfide as a nucleus, elongation of the manganese sulfide particles is suppressed during hot working to maintain a spherical shape thereof. Thus, machinability may be improved. However, since calcium has a low yield and the above effects may be saturated even in the case in which calcium is included in an amount greater than 0.01%, a large amount of calcium may be required to be added to increase the amount of calcium contained. Thus, it may not be desirable in terms of manufacturing costs. In the case that the amount of calcium is less than 0.001%, the effects thereof may be insignificant. Therefore, it may be desirable to control the lower limit to be 0.001%.

The steel of the present invention may further include one or more elements of 0.5 wt % or less of titanium (Ti), 0.5 wt % or less of niobium (Nb), 0.5 wt % or less of vanadium (V), and 1 wt % or less of nitrogen (N) if necessary, in addition to the above components.

Titanium (Ti): 0.5% or Less

Titanium is an element increasing strength through solid solution and precipitation hardening effects, and is an element that may particularly prevent the degradation of the strength by suppressing grain growth due to titanium carbide/nitride in a weld heat-affected zone. However, in the case that titanium is added in an amount greater than 0.5%, coarse precipitates are formed to deteriorate physical properties of the steel. Thus, the upper limit thereof may be controlled to be 0.5%.

Niobium (Nb): 0.5% or Less

Niobium is an element increasing strength through solid solution and precipitation hardening effects, and niobium may particularly increase a recrystallization stop temperature (Tnr) of a steel to improve yield strength by grain refinement during low-temperature rolling. However, in the case that niobium is added in an amount greater than 0.5%, coarse precipitates are formed to deteriorate physical properties of the steel. Thus, the upper limit thereof may be controlled to be 0.5%.

Vanadium (V): 0.5% or Less

Vanadium is an element increasing strength through solid solution and precipitation hardening effects. However, in the case that vanadium is added in an amount greater than 0.5%, coarse precipitates are formed to deteriorate physical properties of the steel. Thus, the upper limit thereof may be controlled to be 0.5%.

Nitrogen (N): 1% or Less

Nitrogen is an element stabilizing austenite together with carbon, and is particularly a relatively favorable element that improves strength through solid solution strengthening such as carbon. However, in the case that nitrogen is added in an amount greater than 1%, coarse nitrides are formed to deteriorate physical properties of the steel. Therefore, the amount of nitrogen may be limited to 1% or less.

The steel having the above-described composition has excellent ultra-low temperature toughness in a weld heat-affected zone while having an austenitic structure. According to a preferred embodiment of the present invention, the steel of the present invention may have a Charpy impact value of a weld heat-affected zone of 41 J or more at −196° C.

Within the composition ranges satisfying the above-described component system, the steel of the present invention may be manufactured by hot rolling and cooling process or by reheating after hot rolling and cooling process, and a microstructure of the weld heat-affected zone may include austenite having an area fraction of 95% or more. In addition to the austenite, an inevitably formed impure structure, such as martensite, bainite, pearlite, and ferrite, may be partially included. Herein, it should be noted that an amount of each structure is an amount when the sum of phases of the steel is regarded as 100% without including precipitates such as carbide. Also, in the steel of the present invention, an area fraction of carbide located at austenite grain boundaries in the microstructure of the weld heat-affected zone may be 5% or less.

An ultra-low temperature, as a criterion for verifying the faction of the austenite structure, is determined to be −196° C. That is, in the case that the fraction of the austenite structure is outside the above-described range, sufficient toughness, i.e., an imparted toughness of 41 J or more at −196° C., may not be obtained.

Hereinafter, a method of manufacturing the above-described austenitic steel having excellent ultra-low temperature toughness in a weld heat-affected zone of the present invention will be described.

According to an embodiment of the present invention, a weld heat-affected zone is obtained by welding a steel sheet (steel) manufactured by rough rolling, finish rolling, and subsequent cooling of a slab satisfying the above-described composition. Thereafter, the weld heat-affected zone is cooled at a cooling rate of 10° C./s or more.

The reason for setting the cooling rate of the weld heat-affected zone to 10° C./s or more is to obtain a structure in which an area fraction of austenite in the weld heat-affected zone is 95% or more and an area fraction of carbide located at austenite grain boundaries is 5% or less. That is, the above cooling rate is favorable to the suppression of carbide formation in the case that the amounts of added Cr and C, as carbide-forming elements, are large.

MODE FOR INVENTION

Hereinafter, the present invention will be described in detail, according to specific examples. However, the following example is merely provided to more clearly understand the present invention, not to limit the scope of the present invention.

Example 1

A steel was manufactured by heating-hot rolling-cooling-welding a slab satisfying component systems described in the following Table 1 under conditions listed in Table 2, and microstructure, yield strength, tensile strength, elongation, weld heat-affected zone (HAZ), and Charpy impact toughness were then measured. The results thereof are presented in Table 3 below. In Table 1, a unit of the amount of each component is weight percentage (wt %).

TABLE 1

| Category | Mn | C | 23.6C + Mn | 33.5C − Mn | Cu | Cr | 28.5C + 4.4Cr | Ti | Nb | V | N |
|---|---|---|---|---|---|---|---|---|---|---|---|
| Inventive Example A1 | 18.12 | 0.62 | 32.8 | 2.7 | 0.12 | 0.2 | 17.9 | | | 0.002 | 0.012 |
| Inventive Example A2 | 18.15 | 0.91 | 39.6 | 12.3 | 0.3 | 0.1 | 26.4 | | | — | 0.013 |
| Inventive Example A3 | 21.98 | 0.59 | 35.9 | −2.2 | 0.08 | 2.76 | 29.0 | 0.01 | 0.02 | 0.001 | 0.017 |
| Inventive Example A4 | 30.6 | 0.28 | 37.2 | −21.2 | 0.12 | 1.2 | 13.3 | | | — | 0.13 |
| Inventive Example A5 | 30.5 | 0.29 | 37.3 | −20.8 | 0.13 | 0.2 | 9.1 | 0.02 | 0.02 | 0.02 | 0.021 |
| Inventive Example A6 | 25.4 | 0.37 | 34.1 | −13.0 | 1.12 | 3.85 | 27.5 | | | 0.02 | 0.018 |
| Inventive Example A7 | 18.13 | 0.61 | 32.5 | 2.3 | 1.5 | 1.25 | 22.9 | | | — | 0.012 |
| Inventive Example A8 | 24.32 | 1.06 | 49.3 | 11.2 | 1.25 | 0.8 | 33.7 | 0.01 | 0.02 | 0.001 | 0.023 |
| Inventive Example A9 | 15.2 | 0.95 | 37.6 | 16.6 | 2.1 | 0.4 | 28.8 | | | — | 0.009 |
| Comparative Example A1 | 17.03 | 0.26 | 23.2 | −8.3 | | | 7.4 | | | | 0.009 |

TABLE 1-continued

| Category | Mn | C | 23.6C + Mn | 33.5C − Mn | Cu | Cr | 28.5C + 4.4Cr | Ti | Nb | V | N |
|---|---|---|---|---|---|---|---|---|---|---|---|
| Comparative Example A2 | 18.25 | 1.36 | 50.3 | 27.3 | | | 38.8 | | | | 0.011 |
| Comparative Example A3 | 14.2 | 0.67 | 30.0 | 8.2 | | | 19.1 | | | | 0.008 |
| Comparative Example A4 | 12.5 | 0.81 | 31.6 | 14.6 | | | 23.1 | | | | 0.006 |
| Comparative Example A5 | 21.54 | 0.63 | 36.4 | −0.4 | 5.15 | | 18.0 | | | | 0.015 |
| Comparative Example A6 | 10.51 | 0.42 | 20.4 | 3.6 | | | 12.0 | | | | 0.009 |
| Comparative Example A7 | 14.6 | 0.94 | 36.8 | 16.9 | | | 26.8 | | | | 0.012 |
| Comparative Example A8 | 22 | 1.15 | 49.1 | 16.5 | | 6.5 | 61.4 | | | 0.01 | 0.016 |
| Comparative Example A9 | 15 | 0.97 | 37.9 | 17.5 | 2.12 | 0.41 | 29.4 | | | | 0.009 |

TABLE 2

| Category | Heating furnace temperature (° C.) | Rolling end temperature (° C.) | Cooling rate (° C./s) | Cooling rate of weld heat-affected zone (° C./s) |
|---|---|---|---|---|
| Inventive Example A1 | 1160 | 920 | 5.2 | 18 |
| Inventive Example A2 | 1160 | 925 | 11.5 | 25 |
| Inventive Example A3 | 1140 | 895 | 15.3 | 28 |
| Inventive Example A4 | 1180 | 887 | 3.54 | 12 |
| Inventive Example A5 | 1180 | 932 | 3.62 | 12 |
| Inventive Example A6 | 1160 | 875 | 18.7 | 16 |
| Inventive Example A7 | 1160 | 912 | 16.7 | 21 |
| Inventive Example A8 | 1140 | 896 | 25.4 | 32 |
| Inventive Example A9 | 1160 | 926 | 18.4 | 22 |
| Comparative Example A1 | 1160 | 859 | 4.15 | 9 |
| Comparative Example A2 | 1140 | 921 | 12.6 | 16 |
| Comparative Example A3 | 1160 | 918 | 8.42 | 12 |
| Comparative Example A4 | 1160 | 915 | 5.62 | 13 |
| Comparative Example A5 | 1140 | — | — | — |
| Comparative Example A6 | 1160 | 875 | 3.85 | 8 |
| Comparative Example A7 | 1160 | 907 | 9.45 | 16 |
| Comparative Example A8 | 1140 | 945 | 17.4 | 15 |
| Comparative Example A9 | 1160 | 925 | 18.5 | 7.2 |

TABLE 3

| Category | Carbide area fraction of weld heat-affected zone (%) | Yield strength (MPa) | Tensile strength (MPa) | Elongation (%) | Charpy impact value of weld heat-affected zone at −196° C. (J) |
|---|---|---|---|---|---|
| Inventive Example A1 | 0.8 | 363 | 1006 | 70 | 62 |
| Inventive Example A2 | 0.8 | 372 | 972 | 58 | 73 |
| Inventive Example A3 | 0.6 | 432 | 984 | 48 | 131 |
| Inventive Example A4 | 0 | 385 | 865 | 54 | 125 |
| Inventive Example A5 | 0 | 365 | 845 | 57 | 134 |
| Inventive Example A6 | 0.3 | 470 | 896 | 45 | 135 |
| Inventive Example A7 | 0.2 | 405 | 1012 | 56 | 65 |
| Inventive Example A8 | 1 | 442 | 1013 | 56 | 116 |
| Inventive Example A9 | 1.1 | 407 | 1021 | 42 | 70 |
| Comparative Example A1 | 0(austenite + ε-martensite) | 342 | 826 | 35 | 26 |
| Comparative Example A2 | 16.5 | 403 | 692 | 5 | 5 |
| Comparative Example A3 | 1.2 | 327 | 821 | 38 | 23 |
| Comparative Example A4 | 5.6 | 342 | 864 | 35 | 7 |
| Comparative Example A5 | — | — | — | — | — |
| Comparative Example A6 | 0(austenite + ferrite) | 352 | 765 | 12 | 4 |
| Comparative Example A7 | 6.7 | 356 | 832 | 31 | 21 |
| Comparative Example A8 | 12.6 | 430 | 912 | 6 | 3 |
| Comparative Example A9 | 9.7 | 411 | 726 | 18 | 8 |

Inventive Examples A1 to A9, as steels satisfying the component system and composition range which are controlled in the present invention, exhibited that an area fation of carbide in the weld heat-affected zone may be controlled to be 5% or less, stable austenite structures may be obtained, and excellent toughness may be obtained at ultra-low temperatures. It may be confirmed that stable austenite was obtained even in a relatively low amount range of manganese due to the addition of an appropriate amount of carbon, carbide formation was suppressed by the addition of copper in the case that the amount of carbon was particularly large, and fracture toughness was improved due to the improvements of strength and austenite stability. In particular, it may be understood that carbide formation was effectively suppressed by adding about 2.1% of copper in Inventive Example A9, and the above effect was better than that of Comparative Example 7 in which copper was not added.

In contrast, with respect to Comparative Example A1, since the amount of carbon did not correspond to the range controlled in the present invention, austenite stabilization effect was insufficient. Thus, it may be confirmed that toughness was poor due to the formation of a metastable ε-martensite phase.

Also, with respect to Comparative Example A2, since the amount of carbon exceeded the range controlled in the present invention, carbide was formed. Thus, it may be confirmed that elongation and toughness were reduced. Furthermore, with respect to Comparative Examples A3 and A4, the amount of carbon corresponded to the range controlled in the present invention. However, since the amount of manganese was insufficient, austenite stability at an ultra-low temperature was reduced. Thus, it may be confirmed that impact toughness was poor due to deformation-induced transformation of austenite during an impact test at an ultra-low temperature.

In Comparative Example A5, the amounts of manganese and carbon corresponded to the ranges controlled in the present invention. However, since copper was added in an amount greater than the range controlled in the present invention, hot workability of the material rapidly deteriorated to form severe cracks during hot working. Thus, a sound rolled material may not be obtained.

In Comparative Example A6, both the amounts of manganese and carbon did not correspond to the ranges controlled in the present invention. As a result, ferrite was formed, and it may be confirmed that impact toughness was poor.

In Comparative Example A7, since the amount of manganese did not correspond to the range controlled in the present invention, austenite stability at an ultra-low temperature was reduced. Thus, it may be confirmed that impact toughness was poor due to deformation-induced transformation of austenite during an impact test at an ultra-low temperature.

In Comparative Example A8, both the amounts of manganese and carbon corresponded to the ranges controlled in the present invention. However, since chromium was added in an amount greater than the range controlled in the present invention, carbide precipitated. Thus, it may be confirmed that impact toughness was poor.

With respect to Comparative Example A9, the composition thereof satisfied the range defined in the present invention, but the cooling rate of the weld heat-affected zone was less than 10° C./s. Thus, it may be understood that low-temperature toughness was poor due to the formation of a large amount of carbides.

Figure 2:
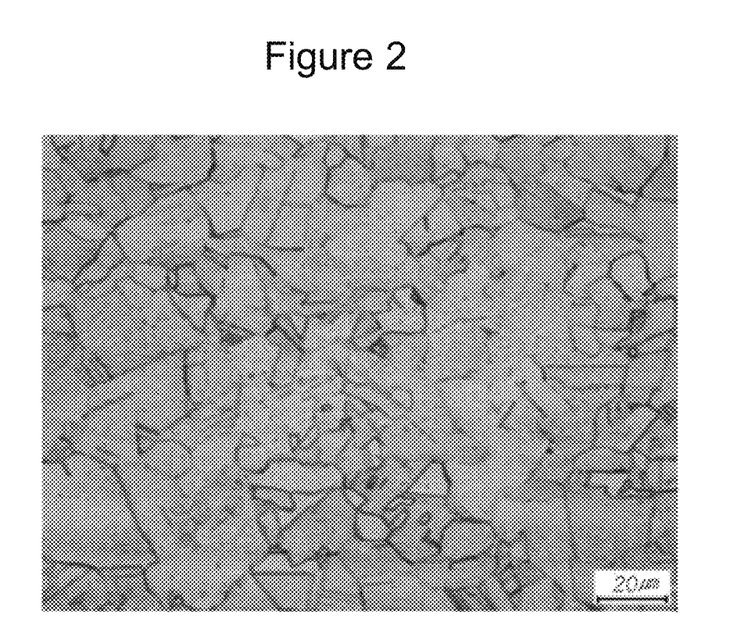
FIG. 2 is a room temperature optical micrograph of a steel according to an embodiment of the present invention.
Figure 3:
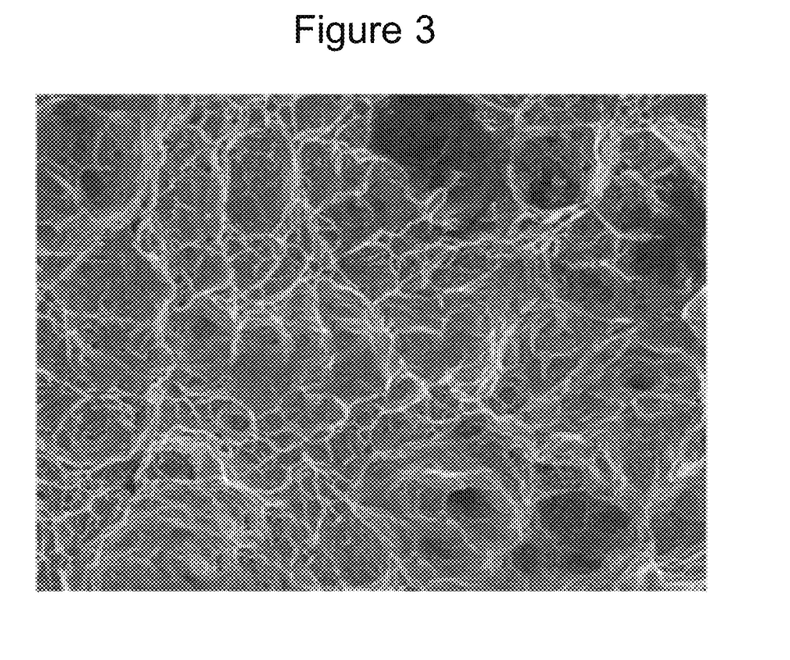
FIG. 3 is a fracture surface image of the steel according to the embodiment of the present invention after a Charpy impact test at −196° C.

FIG. 2 illustrates a micrograph of a steel sheet manufactured according to Inventive Example A3, in which it may be confirmed that a microstructure is composed of austenite and carbide having an area fraction of 5% or less. FIG. 3 illustrates a fracture surface image of an ultra-low temperature impact test specimen of the same inventive example, wherein the image showed a shape of ductile fracture. Thus, it may be confirmed that the stabilization of austenite was effectively possible by the control of the component system and composition range of the present invention.

Therefore, favorable effects of the present invention may be confirmed.

Example 2

Steel slabs of inventive examples and comparative examples satisfying component systems listed in the following Table 4 were manufactured by continuous casting. In Table 4, a unit of the amount of each component is weight %.

TABLE 4

| Category | Mn | C | 23.6C + Mn | 33.5C − Mn | Cu | Cr | 28.5C + 4.4Cr | Ca | S | Ti | Nb | V | N |
|---|---|---|---|---|---|---|---|---|---|---|---|---|---|
| Inventive Example B1 | 18.13 | 0.61 | 32.5 | 2.3 | 1.5 | 1.25 | 22.9 | 0.008 | 0.05 | | | 0.002 | 0.012 |
| Inventive Example B2 | 25.4 | 0.37 | 34.1 | −13.0 | 1.11 | 3.8 | 27.3 | 0.007 | 0.04 | | | — | 0.011 |
| Inventive Example B3 | 25 | 0.35 | 33.3 | −13.3 | 1.12 | 3.85 | 26.9 | 0.008 | 0.06 | 0.01 | 0.02 | 0.001 | 0.017 |
| Inventive Example B4 | 24.9 | 0.37 | 33.6 | −12.5 | 1.12 | 4.01 | 28.2 | 0.007 | 0.08 | | | — | 0.013 |
| Inventive Example B5 | 24.32 | 1.06 | 49.3 | 11.2 | 1.25 | 0.8 | 33.7 | 0.006 | 0.09 | | | 0.02 | 0.021 |
| Comparative Example B1 | 18.12 | 0.62 | 32.8 | 2.7 | 0.12 | 0.2 | 17.9 | | | | | 0.002 | 0.012 |
| Comparative Example B2 | 18.15 | 0.91 | 39.6 | 12.3 | 0.3 | 0.1 | 26.4 | | 0.02 | | | — | 0.013 |
| Comparative Example B3 | 21.98 | 0.59 | 35.9 | −2.2 | 0.08 | 2.76 | 29.0 | 0.004 | | 0.01 | 0.02 | 0.001 | 0.016 |
| Comparative Example B4 | 30.6 | 0.28 | 37.2 | −21.2 | 0.12 | 1.2 | 13.3 | | | | | — | 0.13 |
| Comparative Example B5 | 30.5 | 0.29 | 37.3 | −20.8 | 0.13 | 0.2 | 9.1 | | 0.02 | 0.02 | 0.02 | 0.02 | 0.021 |

The steel slabs thus manufactured were heated under conditions of Table 5. Then, hot finish rolling was performed, and each weld heat-affected zone was cooled.

TABLE 5

| Category | Heating furnace temperature (° C.) | Rolling end temperature (° C.) | Cooling rate (° C./s) | Cooling rate of welding zone (° C./s) |
|---|---|---|---|---|
| Inventive Example B1 | 1160 | 912 | 16.7 | 17 |
| Inventive Example B2 | 1160 | 875 | 18.6 | 25 |
| Inventive Example B3 | 1150 | 880 | 18.7 | 28 |
| Inventive Example B4 | 1150 | 878 | 19.2 | 26 |
| Inventive Example B5 | 1140 | 896 | 25.4 | 12 |
| Comparative Example B1 | 1160 | 920 | 5.2 | 18 |
| Comparative Example B2 | 1160 | 925 | 11.5 | 25 |
| Comparative Example B3 | 1140 | 895 | 15.3 | 28 |
| Comparative Example B4 | 1180 | 887 | 3.54 | 12 |
| Comparative Example B5 | 1180 | 932 | 3.62 | 12 |

An area fraction of carbide in a weld heat-affected zone, yield strength, tensile strength, elongation, and a Charpy impact value of the weld heat-affected zone at −196° C. were measured for each steel thus manufactured, and the results thereof are presented in Table 6 below. In order to evaluate machinability, holes were repeatedly drilled in each steel with a high-speed steel drill bit having a diameter of 10 mm under conditions of a rotational speed of 130 rpm and a forward speed of 0.08 mm/rev until the drill bit was worn and the useful life thereof was ended. Then, the number of holes was measured, and the results thereof are presented in Table 6.

TABLE 6

| Category | Carbide area fraction of weld heat-affected zone (%) | Yield strength (MPa) | Tensile strength (MPa) | Elongation (%) | Charpy impact value of weld heat-affected zone at −196° C. (J) | Number of holes (numbers) |
|---|---|---|---|---|---|---|
| Inventive Example B1 | 0.2 | 405 | 1012 | 56 | 65 | 8 |
| Inventive Example B2 | 0.3 | 467 | 896 | 45 | 135 | 12 |
| Inventive Example B3 | 0.3 | 470 | 898 | 44 | 132 | 14 |
| Inventive Example B4 | 0.3 | 472 | 890 | 46 | 125 | 17 |
| Inventive Example B5 | 1 | 442 | 1013 | 56 | 116 | 8 |
| Comparative Example B1 | 0.8 | 323 | 1006 | 70 | 62 | 2 |
| Comparative Example B2 | 0.8 | 356 | 972 | 58 | 73 | 1 |
| Comparative Example B3 | 0.6 | 432 | 984 | 48 | 131 | 3 |
| Comparative Example B4 | 0 | 385 | 865 | 54 | 125 | 4 |
| Comparative Example B5 | 0 | 365 | 845 | 57 | 134 | 4 |

With respect to the present embodiment, as steels in which amounts of carbon, manganese, chromium, and copper satisfied both the component systems and composition ranges controlled in the present invention, since the precipitation of grain boundary carbide in the weld heat-affected zone was effectively suppressed by the addition of copper, the area fraction thereof was controlled to be 5% or less. Thus, it may be understood that low-temperature toughness was excellent. Specifically, the formation of carbides was effectively suppressed due to the addition of copper even in the case in which the amount of carbon is high, and thus, targeted microstructures and physical properties may be obtained.

Comparative Examples B1 to B5 corresponded to steels in which amounts of calcium and sulfur did not satisfy the composition ranges controlled in the present invention. It may be understood that machinability was poor.

In contrast, Inventive Examples B1 to B5 corresponded to steels in which the amounts of sulfur and calcium satisfied the composition ranges controlled in the present invention, wherein it may be understood that machinability was excellent in comparison to comparative examples. In particular, Inventive Examples B2 to B4 were cases in which the amount of sulfur was changed, and it may be understood that the machinability was further improved due to the increase in the amount of sulfur.

Figure 4:
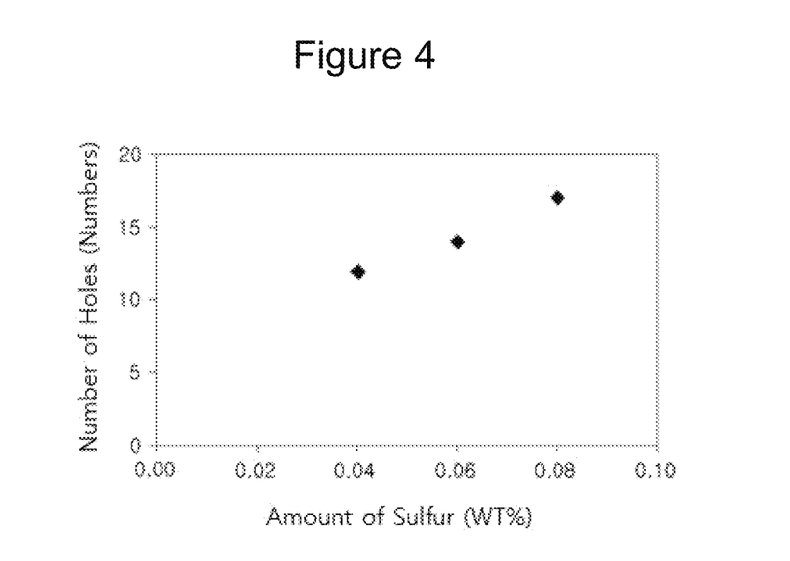
FIG. 4 is a graph illustrating a relationship between machinability and the amount of sulfur according to an embodiment of the present invention.

FIG. 4 illustrates machinability according to the amount of sulfur. It may be understood that the machinability increased as the amount of sulfur was increased.

While the present invention has been shown and described in connection with the exemplary embodiments, it will be apparent to those skilled in the art that modifications and variations can be made without departing from the spirit and scope of the invention as defined by the appended claims.

The invention claimed is:

1. An austenitic steel having improved machinability and ultra-low temperature toughness in a weld heat-affected zone, the austenitic steel comprising:
a parent material and a weld heat-affected zone,
wherein the parent material comprises:
15 wt % to 35 wt % of manganese (Mn);
carbon (C) satisfying $23.6C+Mn \geq 28$ and $33.5C-Mn \leq 23$;
5 wt % or less (excluding 0 wt %) of copper (Cu);
chromium (Cr) satisfying $28.5C+4.4Cr \leq 57$ (excluding 0 wt %);

0.012 wt % to 0.13 wt % of nitrogen (N);

0.5 wt % or less (excluding 0 wt %) of niobium (Nb); and iron (Fe) as well as other unavoidable impurities as a remainder, and wherein a microstructure of the weld heat-affected zone comprises austenite having an area fraction of 95% or more, and wherein an area fraction of carbide located at austenite grain boundaries in the weld heat-affected zone is 5% or less.

2. The austenitic steel having improved machinability and ultra-low temperature toughness in a weld heat-affected zone of claim 1, the parent material further comprising:

0.03 wt % to 0.1 wt % of sulfur (S); and 0.001 wt % to 0.01 wt % of calcium (Ca), wherein a Charpy impact value of the weld heat-affected zone at −196° C. is 41 J or more.

3. The austenitic steel having improved machinability and ultra-low temperature toughness in a weld heat-affected zone of claim 1, the parent material further comprising at least one of 0.5 wt % or less of titanium (Ti), and 0.5 wt % or less of vanadium (V).

\* \* \* \* \*